Feb. 19, 1957 G. P. McGRAW, JR 2,781,983
STRIP WINDING APPARATUS
Filed Nov. 8, 1952 4 Sheets-Sheet 1
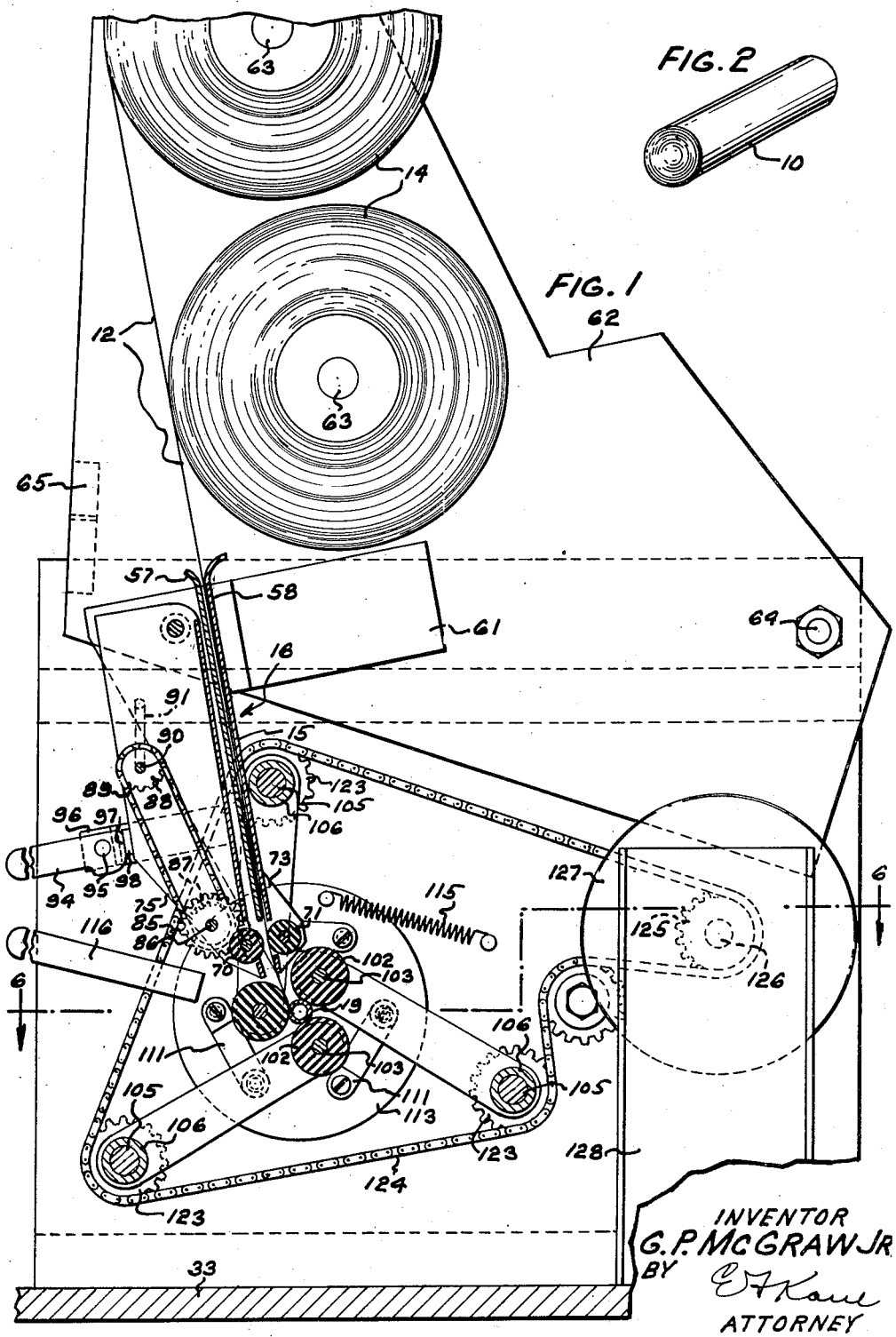
INVENTOR
G. P. MCGRAW JR
BY
ATTORNEY Feb. 19, 1957

G. P. McGRAW, JR 2,781,983

STRIP WINDING APPARATUS

Filed Nov. 8, 1952

INVENTOR
G. P. McGRAW JR.
BY E. F. Kane
ATTORNEY

INVENTOR
G. P. McGRAW JR.
BY （signature）
ATTORNEY

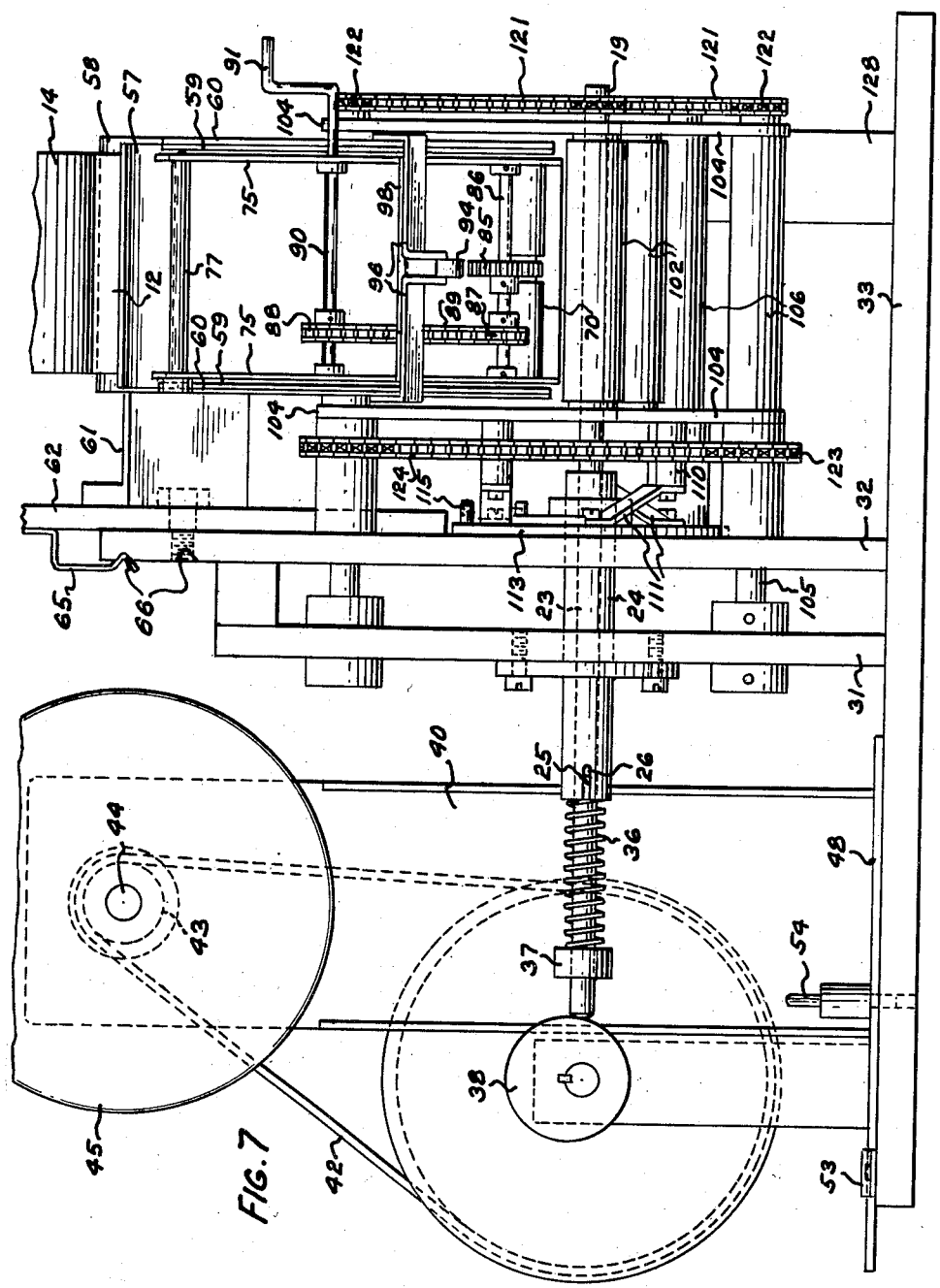

United States Patent Office 2,781,983
Patented Feb. 19, 1957

2,781,983

STRIP WINDING APPARATUS

George P. McGraw, Jr., Downers Grove, Ill., assignor to Western Electric Company, Incorporated, New York, N. Y., a corporation of New York Application November 8, 1952, Serial No. 319,501

6 Claims. (Cl. 242—55)

This invention relates to a strip winding apparatus and more particularly to an apparatus for winding capacitor rolls.

An object of the present invention is to provide an improved apparatus for winding capacitors.

Further objects of the invention are to provide an improved method of and apparatus for winding strip material into rolls.

This invention contemplates a method of and apparatus for winding a strip of material into rolls by advancing the end of a strip through a slot in a longitudinally slotted non-rotatable tubular forming member into tangential engagement with the inner cylindrical surface thereof to cause the end portions of the strip to be guided thereby in a spiral path to form the initial convolutions of a roll, axially withdrawing the tubular forming member and engaging the outer periphery of the roll with a plurality of yieldably mounted rotatable rollers, and then rotating the rollers to impart rotation to the roll to continue the winding of the strip onto the roll.

Other objects and advantages of the present invention will become apparent by reference to the following detailed description and the accompanying drawings illustrating a preferred embodiment thereof, in which Fig. 1 is a front elevational sectional view of the apparatus;

Fig. 2 is a view in perspective of a capacitor roll wound on the apparatus;

Fig. 7 is a side elevational view of the apparatus.

Figure 3:
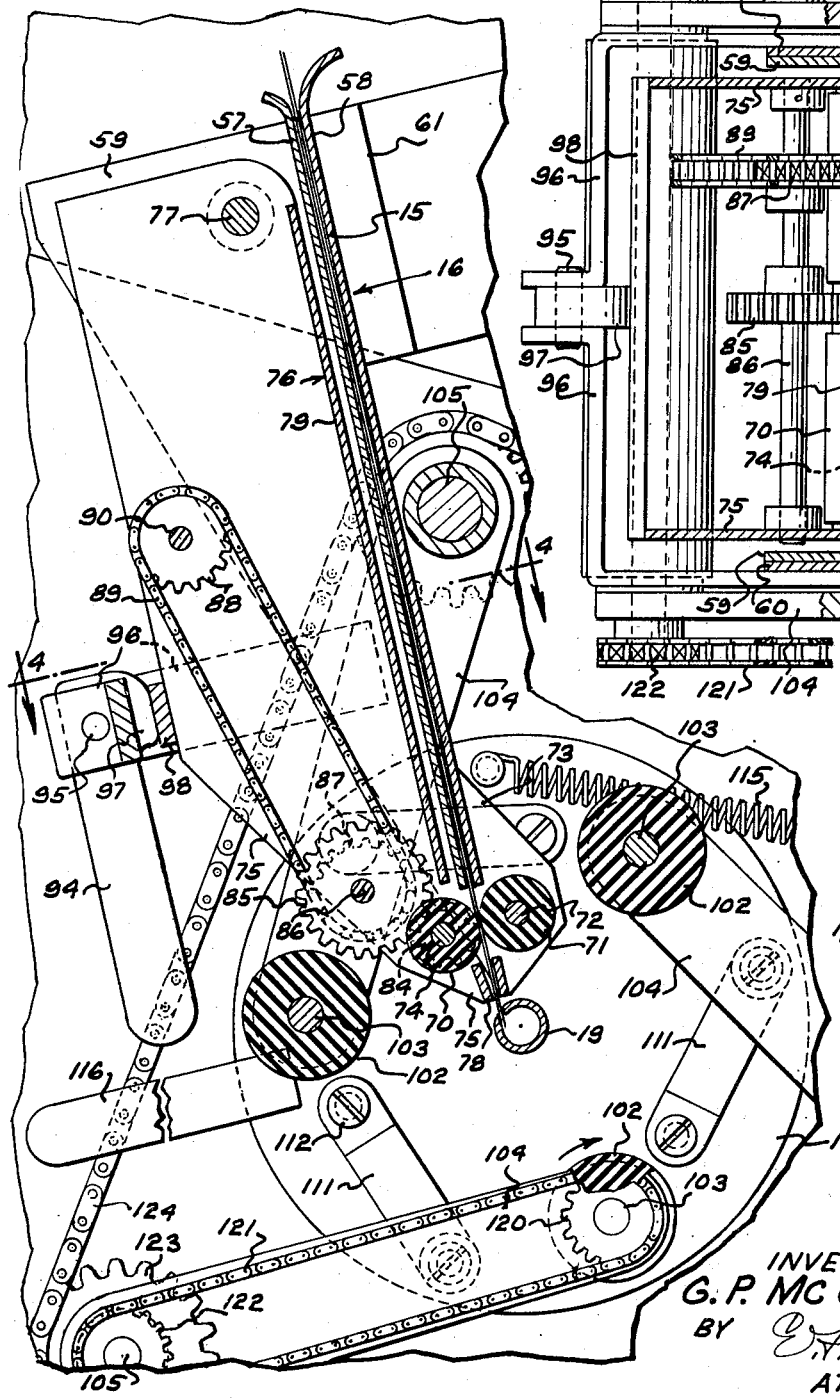
Fig. 3 is an enlarged view of a portion of the apparatus shown in Fig. 1 with parts thereof shown in changed position.

The apparatus is designed to wind a capacitor 10 (Fig. 2) from strips of dielectric and conducting material. The capacitor may be wound from individual strips of dielectric and of foil, but as shown herein the capacitor is wound from a pair of composite strips 12, each strip comprising a ribbon of dielectric having a film of vaporized metal thereon. The strips 12 from a pair of supply rolls 14 are adapted to be advanced through a guideway 15 of a guide 16 and through a slot 18 of a hollow cylindrical former or guide member 19 for guiding the leading end of the strip into a roll. The strips 12 are directed through the slot 18 into tangential engagement with the inner surface of the former and as the strips are advanced, the leading edge thereof is guided in a circular or spiral path to form the initial convolutions of the roll. The hollow former 19 may be formed from a tube but is shown herein as being formed from a rod 23 and being mounted for axial movement in a bearing member 24. The former is held against rotation by a pin 25 thereon which fits into and is slidable in a slot 26 in the end of the bearing 24. The bearing member 24 is secured to a frame member 30 comprising a pair of plates 31 and 32 mounted in spaced relation to each other on a base plate 33.

Figure 6:
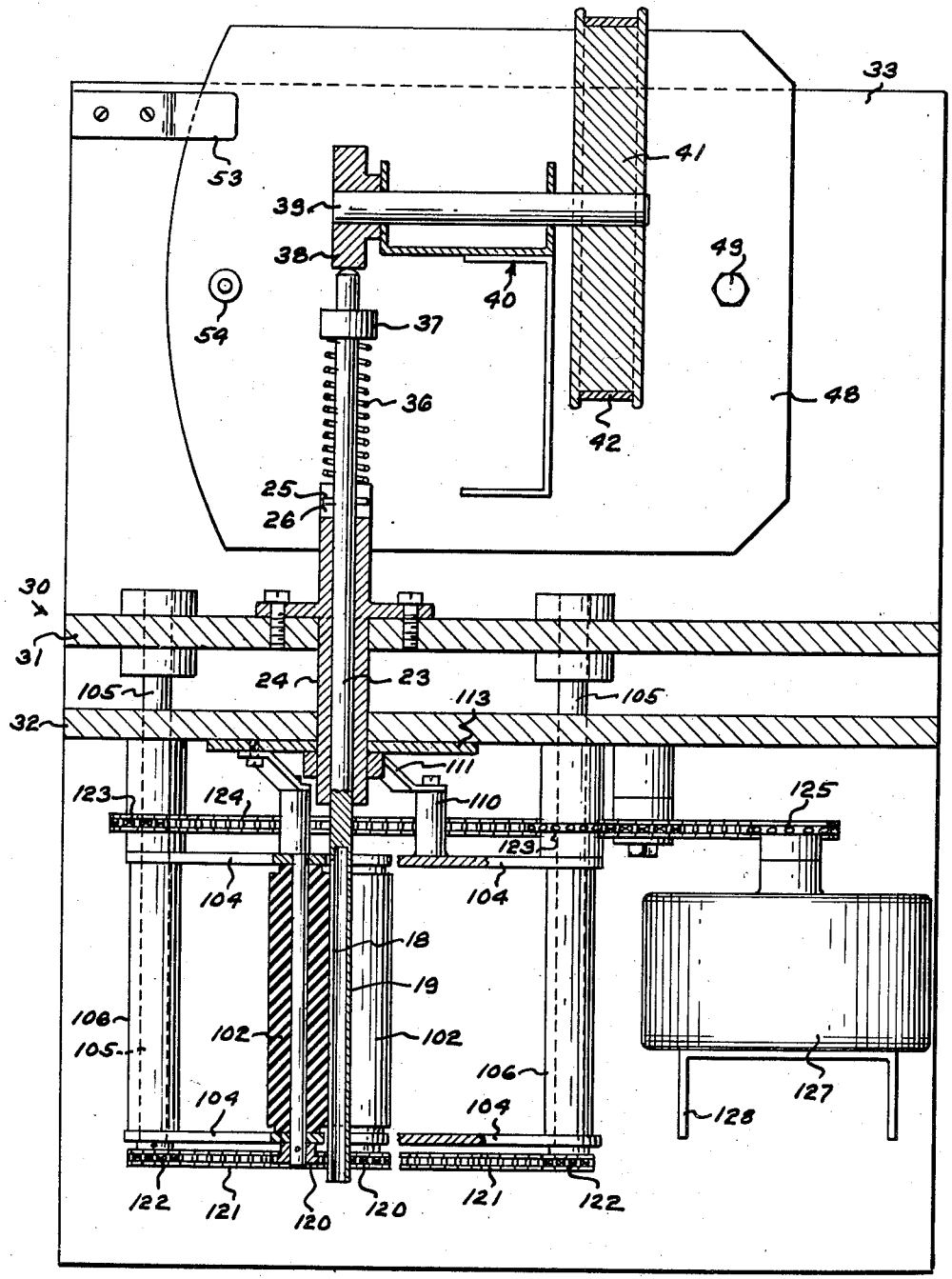
Fig. 6 is a plan sectional view taken on the line 6—6 of Fig. 1.

To facilitate the advancing movement of the end portion of the strips 12 into the former 19 and the winding of the leading end thereof into a roll, the former 19 is adapted to be vibrated along its axis. A spring 36, encircling the former 19 and interposed between a collar 37 on the former and the end of the bearing member 24, urges the former in one direction against a cam 38 fixed to a shaft 39 which is suitably journalled for rotation in a frame member 40. A pulley 41, which is also fixed to the shaft 39, is connected through a belt 42 and a pulley 43 to a motor shaft 44 of a motor 45 for rotating the cam 38 to axially reciprocate or vibrate the former 19. The motor 45 is mounted on the vertical frame member 40 which is mounted on a horizontal plate 48 and the plate 48 is supported on and pivotally connected to the base plate 33 for pivotal movement about a pivot screw 49 at one end of the plate 48. A member 53 secured to the base plate 33, overhangs a portion of the other end of the plate 48 to prevent vertical displacement thereof and a locking pin 54 movably mounted on the plate 48 is adapted to engage in an aperture 55 in the base plate 33 to lock the plate 48 and the vibrating mechanism thereon in an operative position as shown in Figs. 6 and 7. By disengaging the locking pin 54 from the base plate 33, the plate 48 and the vibrating mechanism thereon may be moved to provide clearance for a partial withdrawal of the former 19 to disengage the slotted tubular guide portion thereof from the strips 12.

The guideway 15 of the guide 16 is formed by a pair of plates 57 and 58 having perpendicularly disposed portions 59 and 60 secured together and forming reinforcing flanges for the guide 16. The guide 16 is secured by means of an L-shaped bracket 61 to a vertically disposed plate 62 on which a pair of holders 63 are mounted for supporting the tape supply rolls 14. The plate 62 is pivotally connected by a pivot screw 64 to the plate 32 of the vertical frame member 30 for movement to and from a first position as shown in Fig. 3 to align the guideway 15 with the slot 18 in the former 19 and a second position as shown in Fig. 1 with the end of the guide 16 spaced from the former 19. A spring clip 65 (Figs. 1 and 7) mounted on the plate 62 and engageable with notches 66 in the plate 32 serve to yieldably support the plate 62 in either of the positions.

Means are provided for feeding the strips 12 to advance the forward ends thereof into the former 19 comprising a pair of feed rollers 70 and 71 engageable with opposite sides of the strips. The roller 71 is carried by a shaft 72, the ends of which are mounted in brackets 73 (Fig. 3) fixed to the guide 16, and the roller 70 has a shaft 74, the ends of which are rotatably supported in the flanged portions 75 of a U-shaped auxiliary frame member 76. The U-shaped auxiliary frame member 76 is positioned between the flanges 59 and 60 of the guide 16 and is pivotally supported on a rod 77 extending between and fixed to the flanges 59 and 60. The lower end 78 of the transverse portion 79 of the auxiliary frame member 76 (Fig. 3) cooperates with the lower end of the plate 58 of the frame 16 to guide the strips 12 into the slot 18 of the former 19. A gear 84 on the shaft 74 meshes with a gear 85 on a shaft 86 which is rotatably supported in the flanges 75 of the frame 76 and is connected through sprockets 87—88 and a chain 89 to a shaft 90, also rotatably supported in the flanges 75 of the frame 76. The shaft 90 has a crank handle 91 (Fig. 7) formed on one end thereof which may be turned to impart rotation to the roller 70 to effect the feeding movement of the strips 12.

Figure 4:
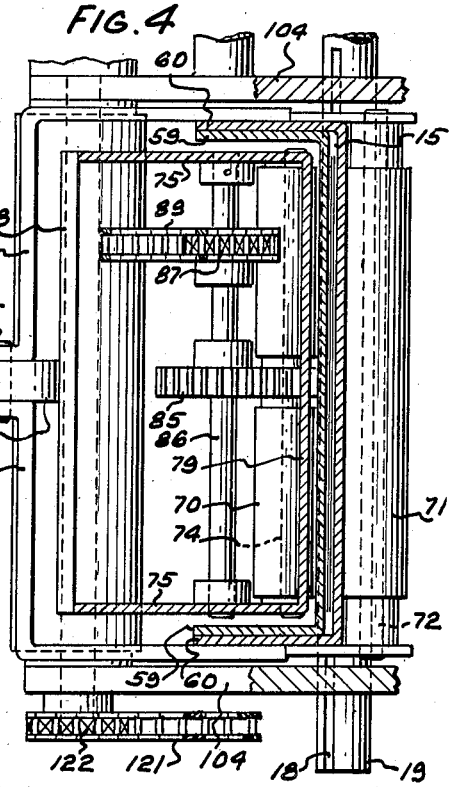
Fig. 4 is a detailed cross-sectional view taken on the line 4—4 of Fig. 3.

The auxiliary frame 76 is adapted to be moved to an open position as shown in Fig. 1 to permit the separation of the feed rolls 70 and 71 during the insertion of the ends of strips 12 into the guide 16. A lever 94 is provided for moving the frame 76 to and from its open and closed positions. The lever 94 is pivotally mounted at 95 on Z-shaped brackets 96 (Figs. 3 and 4) which are fixed to the flanges 60 of the frame 16, and the lever 94 has a cam member 97 engageable with a cross member 98 extending between the flanges 75 of the frame 76 for moving the frame 76 from one position to another in response to turning movement of the lever 94.

Figure 5:
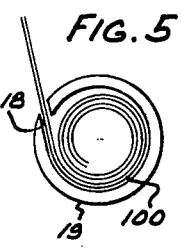
Fig. 5 is a diagrammatic enlarged cross-sectional view of the hollow cylindrical guide member for guiding the ends of the strips of material spirally to form the beginning of a roll.

After several convolutions have been formed on the end of the strips 12 to form the beginning of a roll 100 (Fig. 5) within the tubular former 19, the former is adapted to be axially withdrawn from the roll 100, and mechanism is provided for supporting the roll 100 and rotating it to continue the winding of the strips 12 thereonto. This secondary winding mechanism comprises a plurality of rollers 102 disposed equi-angularly about the axis of former 19 and mounted for simultaneous movement toward and away from the axis. Each of the rollers 102 is mounted on a shaft 103 which is rotatably supported in the ends of a pair of arms 104 which at their other ends are mounted for pivotal movement on shafts 105 and are connected together by sleeves 106. The shafts 105, which are rotatably supported in bearing apertures in the plates 31 and 32 are disposed equi-angularly about the axis of the arbor whereby the arms 104 supported thereon serve to guide the rollers 103 toward and away from the axis. A lug 110 is provided on one of each of the pairs of the arms 104 intermediate the ends thereof and to each of the lugs 110 one end of a link 111 is pivotally connected. The other end of each of the links 111 is pivotally connected at 112 to an apertured disk 113 rotatably supported on the tubular bearing member 24 adjacent the vertical wall 32. The disk 113 is stressed for rotation in a clockwise direction as seen in Figs. 1 and 3 by a spring 115 and has a handle 116 by means of which the disk 113 may be turned in the opposite direction. In response to the tension of the spring 115 the disk 113 is rotated to the position shown in Fig. 1 to cause the rollers 102 to be moved inwardly toward the axis of the former 19 and into engagement with the former and yieldably maintained in said inner position by the spring.

Each of the roller shafts 103 has a sprocket 120 fixed thereto (Figs. 3 and 6) which is connected by a chain 121 to a sprocket 122 on the shafts 105. A second sprocket 123 is fixed to each of the shafts 105 and these are driven in unison by a chain 124 which is connected to a drive sprocket 125 on a motor shaft 126 of a motor 127. The motor 127 is mounted in a suitable frame 128 on the base plate 33 and has a control switch (not shown) by means of which the motor may be started and stopped. In response to the operation of the motor 127 the chain 124 and sprockets 123 impart rotation to the shafts 105 and through the chain and sprocket connection 120—122 impart rotation to the rollers 102 in a counter-clockwise direction as viewed in Figs. 1 and 3.

In the operation of winding the strips 12 into a capacitor roll the former 19 is supported in its normal extended or operative position as shown in Fig. 6, the handle 116 is actuated to move the rollers 102 to their outer position as shown in Fig. 3, the plate 62 is moved to its upper position to position the guide member 16 in spaced relation to the former 19, and the lever 94 is moved to the position shown in Fig. 1 to separate the feed rollers 70 and 71, and with the elements of the apparatus in this position the operator may thread the end portions of the pair of strips 12 into the guideway 15 to a position where the ends of the strip extend below the feed rollers 70 and 71. The lever 94 may then be turned to the position shown in Fig. 3 to move the frame 76 to its closed position for pressing the feed roller 70 against the roller 71 to grip the strips 12 therebetween after which the plate 62 may be moved to its lower position to align the guideway 15 with the slot 18 in the former 19.

The crank 91 may then be turned to impart rotation to the feed rollers 70 and 71 to cause the end of the strips 12 to be fed into the hollow former 19 and into tangential engagement with the inner cylindrical surface thereof and be guided thereby into engagement with succeeding portions of the strips to form the initial convolutions of the roll. During the advancing movement of the end portion of the strips 12 in the former 19, the former 19 is caused to vibrate axially in response to the rotation of the cam 38 to reduce the frictional opposition to the advancing movement of the strips and to facilitate the winding of the initial portion of the capacitor roll 100.

After several convolutions of the capacitor roll have been formed within the hollow former 19, the locking pin 54 may be withdrawn and the vibrating mechanism, including the cam 38, may be turned about the vertical pivot 49 to permit clearance for the withdrawal of the former 19 from engagement with the portion of the roll 100 thus far formed. Prior to or as the former 19 is being withdrawn, the rollers 102 are moved to their inner position to engage and support the roll 100 upon withdrawal of the former 19 and the rollers 102 are yieldably held in engagement with the roll by the action of the spring 115. The motor 127 may then be started to impart rotation to the rollers 102 which in turn impart rotation to the roll 100 and cause it to wind successive portions of the strips 12 thereon. As the capacitor roll 100 increases in size the feed rolls 102 are moved outwardly thereby and after a predetermined length of the strips 12 have been wound onto the roll the motor 127 may be stopped, and the handle 116 may be turned in a clockwise direction to move the rollers 102 to their outer position to release the condenser roll, which may then be removed from the apparatus after severing the roll 100 from the strips 12.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for winding strip material into rolls the combination of a forming member having a concave surface for solely guiding an advancing strip through a curved path to form the initial convolutions of a roll of said strip, means for advancing said strip into engagement with said forming member to effect the formation of several convolutions of a roll in said strip, means for vibrating said forming member axially of said roll, and means engageable with the periphery of said roll for imparting rotation thereto to wind said strip onto said roll.

2. An apparatus for winding strip material into a roll comprising a forming member having a concave surface for guiding an advancing strip through a curved path into engagement with itself to form the initial convolutions of a roll of said strip, means for advancing said strip into said former to effect the formation of several convolutions of a roll in said strip, means mounting said forming member against rotation and for axial movement whereby said forming member may be withdrawn from said roll upon completion of a plurality of convolutions thereof, and means engageable with the outer periphery of said roll for supporting said roll and imparting rotation thereto for winding said strip onto said roll.

3. An apparatus for winding strip material into a roll comprising a former having a concave surface for guiding an advancing strip through a curved path into engagement with itself to form the initial convolutions of a roll of said strip, means for advancing said strip into said former to effect the formation of several convolutions of a roll in said strip, means mounting said former against rotation and for axial movement whereby said former may be withdrawn from said roll upon completion of a plurality of convolutions thereof, means for vibrating said former axially of said roll, and means engageable with the outer periphery of said roll for winding said strip onto said roll.

4. An apparatus for winding strip material into a roll comprising a forming member having a concave surface for guiding an advancing strip through a curved path into engagement with itself to form the initial convolutions of a roll of said strip, means for advancing said strip into said forming member to effect the formation of several convolutions of a roll in said strip, means mounting said forming member against rotation and for axial movement whereby said forming member may be withdrawn from said roll upon completion of a plurality of convolutions thereof, a plurality of rollers disposed about the axis of said forming member, means mounting said rollers for movement toward and away from said axis, means for yieldably urging said rollers toward said axis and into engagement with the roll formed by said forming member, and means for rotating said rollers to impart rotation to said roll to cause the strip to be wound onto said roll.

5. An apparatus for winding strip material into a roll comprising a forming member having a concave surface for guiding an advancing strip through a curved path into engagement with itself to form the initial convolutions of a roll of said strip, means for advancing said strip into said forming member to effect the formation of several convolutions of a roll in said strip, means mounting said forming member against rotation and for axial movement whereby said forming member may be withdrawn from said roll upon completion of a plurality of convolutions thereof, means for axially reciprocating said forming member, a plurality of rollers disposed about the axis of said forming member, means mounting said rollers for movement toward and away from said axis, means for yieldably urging said rollers toward said axis and into engagement with the roll formed by said forming member, and means for rotating said rollers to impart rotation to said roll to cause the strip to be wound onto said roll.

6. A condenser winding apparatus comprising a tubular guide member having a longitudinal slot therein, means mounting said tubular guide member for axial movement and against rotation, guide means for guiding strips of foil and dielectric through said slot into said tubular guide member and tangentially into engagement with the inner surface thereof, means for advancing said strips into said tubular guide member to cause the end portion thereof to be guided in a curved path to form the initial convolutions of a roll, means for axially withdrawing said tubular guide means from said roll, and means engageable with the periphery of said roll for imparting rotary movement to said roll to cause the strips to be wound onto said roll.

References Cited in the file of this patent

UNITED STATES PATENTS

| | | |
|---|---|---|
| 999,352 | Waring | Aug. 1, 1911 |
| 1,467,841 | Cumfer | Sept. 11, 1923 |
| 1,681,046 | Marresford | Aug. 14, 1928 |
| 2,161,076 | Morgan | June 6, 1939 |
| 2,215,174 | Dyken | Sept. 17, 1940 |
| 2,325,559 | Washaw | July 27, 1943 |
| 2,381,033 | Bolsey | Aug. 7, 1945 |
| 2,526,010 | Edstrom | Oct. 17, 1950 |
| 2,573,188 | Dyken | Oct. 30, 1951 |
| 2,611,553 | Dyken | Sept. 23, 1952 |
| 2,673,500 | Cassidy et al. | Mar. 30, 1954 |
| 2,696,335 | Fies | Dec. 7, 1954 |

FOREIGN PATENTS

| | | |
|---|---|---|
| 499,049 | Belgium | Feb. 15, 1951 |